(12) United States Patent
Kawakami

(10) Patent No.: US 7,810,631 B2
(45) Date of Patent: Oct. 12, 2010

(54) BEAN SPROUTS-LIKE ARTICLES LOOSENING SUPPLY DEVICE

(75) Inventor: Sanji Kawakami, Tsurugashima (JP)

(73) Assignee: Daisey Machinery Co., Ltd., Saitama-Ken (JP)

( * ) Notice: Subject to any disclaimer, the term of this patent is extended or adjusted under 35 U.S.C. 154(b) by 441 days.

(21) Appl. No.: 11/984,293

(22) Filed: Nov. 15, 2007

(65) Prior Publication Data

US 2008/0302708 A1 Dec. 11, 2008

(30) Foreign Application Priority Data

Jun. 8, 2007 (JP) .............................. 2007-152583

(51) Int. Cl.
*B65G 15/14* (2006.01)
*B65G 15/42* (2006.01)

(52) U.S. Cl. .................... 198/623; 198/604; 198/626.1; 198/692; 198/693; 460/125

(58) Field of Classification Search ................ 198/623, 198/604, 624, 626.1–626.6, 692–693, 699.1; 460/125, 133, 142, 145, 148
See application file for complete search history.

(56) References Cited

U.S. PATENT DOCUMENTS

| | | | | | |
|---|---|---|---|---|---|
| 2,598,858 | A | * | 6/1952 | Thomas | 198/624 |
| 2,676,694 | A | * | 4/1954 | Fidel et al. | 198/534 |
| 2,775,425 | A | * | 12/1956 | Engvall | 177/120 |
| 2,907,076 | A | * | 10/1959 | Detwiler | 19/100 |
| 3,462,001 | A | * | 8/1969 | Boyce | 198/415 |
| 4,060,167 | A | * | 11/1977 | Smith | 198/622 |
| 4,751,974 | A | * | 6/1988 | Kawakami | 177/114 |
| 4,899,867 | A | * | 2/1990 | Ryan | 198/513 |
| 7,156,222 | B2 | * | 1/2007 | Schnuelle et al. | 198/626.3 |
| 7,520,377 | B2 | * | 4/2009 | Kawakami | 198/493 |
| 2004/0099504 | A1 | * | 5/2004 | Spatafora et al. | 198/438 |
| 2006/0207861 | A1 | * | 9/2006 | Heimsoth | 198/607 |
| 2008/0060914 | A1 | * | 3/2008 | Sprouse et al. | 198/626.1 |

FOREIGN PATENT DOCUMENTS

| | | |
|---|---|---|
| JP | 63-152516 | 6/1988 |
| JP | 63-281901 | 11/1988 |
| JP | 2002-034537 | 2/2002 |

* cited by examiner

*Primary Examiner*—Mark A Deuble
(74) *Attorney, Agent, or Firm*—Wenderoth, Lind & Ponack, L.L.P.

(57) ABSTRACT

A bean sprouts-like articles loosening supply device can exhibit a sufficient dispersing function even for fine and light weight bean sprouts-like articles liable to be entangled with each other, such as alfalfa sprouts. The loosening supply device includes two conveyors having both of their end portions constructed to turn so as to run endlessly, having their outer surfaces provided with needle members, and running at velocities different from each other. The conveyors are arranged to have their running paths opposed to each other so that their running directions are both downward and so that at least one portion of the needle members of the two conveyors mesh into each other. Alfalfa sprouts are supplied into the running paths from above and encounter the needle members of the two conveyors running at velocities different from each other and intersecting with each other. Each time the needle members intersect with each other, the alfalfa sprouts are separated upward and downward and dispersed.

20 Claims, 3 Drawing Sheets

BEAN SPROUTS-LIKE ARTICLES LOOSENING SUPPLY DEVICE

BACKGROUND OF THE INVENTION

1. Field of the Invention

The present invention relates to a bean sprouts-like articles loosening supply device by which various kinds of bean sprouts, cut vegetables, mesclun greens or other slender shape vegetables (all these articles are herein jointly referred to as "bean sprouts-like articles") are loosened to be supplied.

2. Description of the Prior Art

Generally, the bean sprouts-like articles (i.e., slender vegetables) have indefinite shapes and are easily entangled with each other or biased to become a lump which can hardly be transferred and supplied with a good metering ability in a dispersed state. Also, in the course of making commercial products of the bean sprouts-like articles, the bean sprouts-like articles are washed and refined so that unnecessary matters mixing in the bean sprouts-like articles are removed and water content attaching to the bean sprouts-like articles so washed and refined is separated so that the bean sprouts-like articles can be metered by a predetermined quantity to be packaged. For carrying out the washing and refining of the bean sprouts-like articles and also for carrying out the water separation and metering of them, it is essential that the bean sprouts-like articles are to be supplied in the dispersed state. Nevertheless, as mentioned above, the bean sprouts-like articles are generally easily entangled with each other or biased to become a lump and thus are hardly transferred and supplied with good metering ability in the dispersed state.

For example, in case the bean sprouts-like articles are to be metered by a predetermined quantity to be packaged, in order to accurately carry out the metering, the bean sprouts-like articles are to be uniformly supplied into a metering bucket in the dispersed state so that the timing of reaching a predetermined weight can be accurately detected. Thus, such a technology which allows the bean sprouts-like articles to be loosened in the uniformly dispersed state to be supplied is being demanded.

As examples of conventional technologies for uniformly supplying the bean sprouts-like articles in the dispersed state, there are several ones that have been disclosed by the applicant of the present invention. In particular, there is a technology in which in order for the bean sprouts-like articles to be uniformly supplied into a metering bucket for metering, the bean sprouts-like articles are transferred to be lifted up by a scraping-up conveyor and then are caused to fall down from the scraping-up conveyor onto a loosening device, such as a vibrating plate, a quickly running endless belt, etc., so that the bean sprouts-like articles are applied with loosening actions by the loosening device (Patent Document 1). There is another technology in which the bean sprouts-like articles are transferred to be lifted up by a scraping-up conveyor and loosened as if they are torn at a delivery end of the scraping-up conveyor by a loosening device, such as a roller, an endless belt or the like fitted with needle members, and are caused to fall down in a dispersed state (Patent Document 2). There is another technology in which the bean sprouts-like articles are transferred by a supply conveyor and loosened to achieve a dispersed state by a loosening device comprising a plurality of rotating rolls arranged to be rotated faster than the supply conveyor (Patent Document 3).

In the conventional dispersing technology, however, if the bean sprouts-like articles are fine, small and light weight articles to be easily entangled with each other, such as alfalfa sprouts, there often arises such a case that no sufficient dispersing function can be obtained. Such bean sprouts-like articles are entangled with each other to become a lump state, and even if they are thrown into a water tank, it will often be difficult for them to realize a dispersed floating state. In the bean sprouts-like articles liable to become a lump, if metering is to be done, for example, there arises such a case that they fall down as they are in the lump into a metering bucket of a metering apparatus. In this way, if the bean sprouts-like articles are supplied not in the dispersed state but in s lump, the metering bucket receiving the supplied bean sprouts-like articles cannot accurately detect the timing of reaching a predetermined weight and a metering accuracy will be badly affected.

Patent Document 1: Japanese laid-open patent application No. 1988-152516
Patent Document 2: Japanese laid-open patent application No. 1988-281901
Patent Document 3: Japanese laid-open patent application No. 2002-34537

SUMMARY OF THE INVENTION

In view of the above-mentioned shortcomings in the conventional bean sprouts-like articles loosening supply device, it is an object of the present invention to provide a bean sprouts-like articles loosening supply device that can exhibit a sufficient dispersing function even for the fine and light weight bean sprouts-like articles liable to be entangled with each other.

In order to achieve the above-mentioned object, the present invention provides a bean sprouts-like articles loosening supply device that comprises two loosening members having their outer surfaces provided with a plurality of needle members and moving at velocities different from each other, and is constructed so that the two loosening members are arranged having their moving paths opposed to each other so that their moving directions are the same. Furthermore, at least one portion of the needle members of the two loosening members mesh into each other and bean sprouts-like articles are supplied into the moving paths arranged so as to oppose each other.

The loosening members of the loosening supply device according to the present invention may be constructed comprising two conveyors having both end portions constructed to turn so that the conveyors run endlessly, having their outer surfaces provided with the plurality of needle members and running at velocities different from each other.

Or, the loosening members of the loosening supply device according to the present invention may be constructed comprising two rollers having their axial directions arranged in parallel with each other, having their outer surfaces provided with the plurality of needle members and rotating at velocities different from each other.

In the bean sprouts-like articles loosening supply device according to the present invention, the two loosening members having their outer surfaces provided with the plurality of needle members and moving at velocities different from each other are arranged having their moving paths opposed to each other so that their moving directions are the same and at least at one portion of the needle members of the two loosening members mesh into each other. Hence, the bean sprouts-like articles supplied into the moving paths encounter the needle members intersecting with each other of the two loosening members moving at velocities different from each other in the moving paths. On each time of encountering the intersection of the needle members, the bean sprouts-like articles are separated from each other to be dispersed.

In the loosening supply device according to the present invention, the needle members of the above-mentioned two loosening members may have their lengths formed differently from each other. For example, the needle members of the loosening member that moves faster may be formed longer than the needle members of the other loosening member. Alternatively, the needle members having their lengths formed differently from each other may be arranged to be mixed together. Thereby, the loosening function can be enhanced.

Also, two devices of the above-mentioned bean sprouts-like articles loosening supply device may be arranged in series so that the bean sprouts-like articles delivered from the moving paths opposed to each other in the loosening supply device on an upstream side are supplied into the moving paths opposed to each other in the loosening supply device on a downstream side. Thereby, the bean sprouts-like articles are repeatedly applied with the loosening actions in multi-stages and the loosening effect can be enhanced.

Further, in the loosening device according to the present invention, the moving direction in the moving paths arranged to be opposed to each other is not limited but may be appropriately selected, such as a horizontal direction, inclined downward direction, downward direction, etc. But if the loosening members are so constructed as to move downward from above in the moving paths, then the movement of the bean sprouts-like articles applied with the loosening actions can be smoothly carried out.

In case the loosening devices according to the present invention are arranged in series with multi-stages and with the moving direction in the moving paths being set downwardly, the moving paths of the loosening supply device on an upper side and the loosening supply device on a lower side may be arranged being laterally shifted relative to each other.

Thereby, the movement of the bean sprouts-like articles that are sent being biased by the velocity difference between the loosening members can be smoothly carried out.

In the loosening device according to the present invention, it is preferable to provide a casing surrounding the two loosening members and to be provided with a bean sprouts-like articles discharge opening so that the loosened bean sprouts-like articles are prevented from scattering. In this case, if a fluid ejecting nozzle is provided for separating the bean sprouts-like articles sticking to the portion of the bean sprouts-like articles discharge opening of the casing, then the discharge of the loosened bean sprouts-like articles can be smoothly carried out.

In the loosening device according to the present invention, at least one of the two loosening members having their moving paths opposed to each other may have a fluid-passability or permeability so that fluid, such as air, is blown out through the loosening member having the fluid-passability and the bean sprouts-like articles sticking to the needle members are separated or a sterilizing fluid or bleaching fluid is supplied into the moving paths opposed to each other through the loosening member having the fluid-passability. Thereby, such a loosening supply device can be obtained in which the bean sprouts-like articles applied with the loosening operation can be sterilized to be preserved for a longer time and supplied or can be bleached and supplied.

DESCRIPTION OF THE PREFERRED EMBODIMENTS

Figure 1:
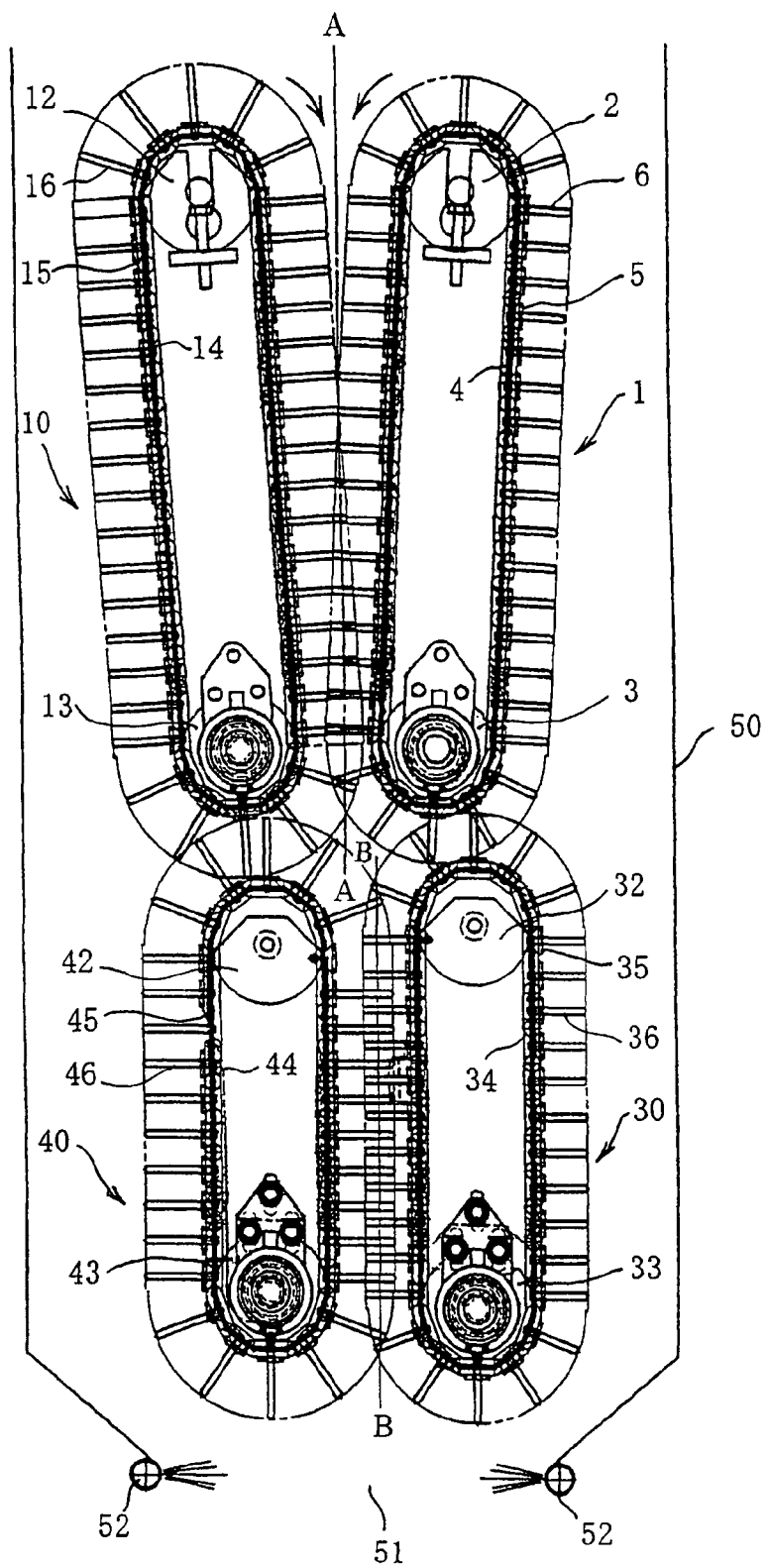
FIG. 1 is a side view showing a construction of a bean sprouts-like articles loosening supply device of an embodiment according to the present invention.
Figure 2:
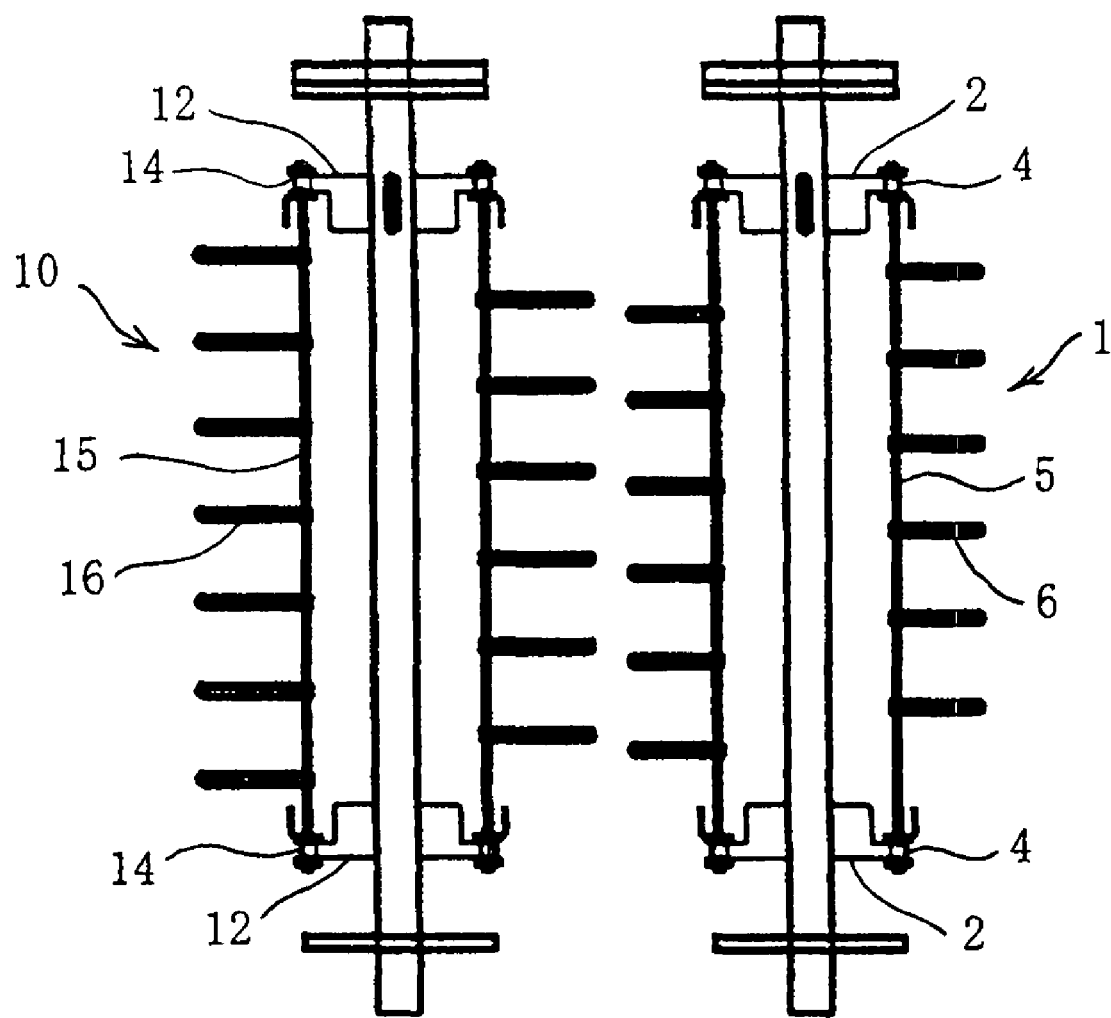
FIG. 2 is a partial plan view of the bean sprouts-like articles loosening supply device of FIG. 1.

Herebelow, the present invention will be more concretely described based on embodiments, as illustrated, of a bean sprouts-like articles (vegetables) loosening supply device according to the present invention. In the embodiments, the present invention is applied to a transfer conveyor device of a sprouts metering apparatus in which alfalfa sprouts, as harvested and refined, are transferred into a metering hopper to be metered by a predetermined quantity to be packaged. In FIGS. 1 and 2, numerals 1 and 10, respectively, designate conveyors running endlessly by turning at their respective both end portions. The conveyors 1, 10 run at velocities different from each other. As the conveyors 1, 10 have substantially the same construction, description will be made on the construction of the conveyor 1. The conveyor 1 comprises four sprockets in total, that is, two sprockets 2, 2 arranged with an interval maintained between them in the direction perpendicular to the plane of FIG. 1 and two sprockets 3, 3 likewise arranged, and two chains 4, 4 endlessly wound around the sprockets 2, 3. The conveyor 1 also comprises a plurality of conveyor plates 5 each having both of their ends fitted to the two chains 4, 4 so that the conveyor 1 is constructed as an endless conveyor. Each of the conveyor plates 5 has its outer surface provided with a plurality of needle members 6 that perpendicularly rise up (extend out) from the outer surface of the conveyor plate 5. Parts and components of the conveyor 10 that correspond to those of the conveyor 1 are shown by reference numerals in which 10 is added to reference numerals of the conveyor 1 and a description thereof will be omitted.

The conveyors 1, 10 are so constructed as to be operated to run with a velocity difference between them. As one example thereof, the conveyor 1 is operated to run at 3.5 cm/sec and the conveyor 10 at 11.0 cm/sec. The needle members 16 of the conveyor 10 are formed longer than the needle members 6 of the conveyor 1.

As seen in the side view of FIG. 1, the conveyors 1, 10 are arranged relative to each other such that while on the upper are of the conveyor belt, they stand apart from each other, and while on the lower are of the conveyor belt, they stand close to each other so that the needle members 6, 16 of the conveyors 1, 10, respectively, get into each other. The conveyors 1, 10 are so constructed that their running paths opposed to each other run in the same downward direction, as shown by arrows in FIG. 1.

Below the conveyors 1, 10, two conveyors 30, 40, respectively, are arranged to run endlessly by turning at their respective end portions. The conveyors 30, 40 are so constructed that they run at velocities different from each other and their running paths opposed to each other run in the same downward direction. As both of the conveyors 30, 40 have substantially the same construction, construction of the conveyor 30 will be described. The conveyor 30 comprises four sprockets in total, that is, two sprockets 32, 32 arranged with an interval maintained between them in the direction perpendicular to the plane of FIG. 1 and two sprockets 33, 33 likewise arranged, and two chains 34, 34 endlessly wound around the sprockets 32, 33. The conveyor 30 also comprises a plurality of conveyor plates 35 each having both of their ends fitted to the two chains 34, 34 so that the conveyor 30 is constructed as an endless conveyor. Each of the conveyor plates 35 has its outer surface provided with a plurality of needle members 36 that perpendicularly rise up from the outer surface of the conveyor plate 35. Parts and components of the conveyor 40 that correspond to those of the conveyor 30 are shown by reference numerals in which 10 is added to reference numerals of the conveyor 30 and description thereof will be omitted.

The conveyors 30, 40 are constructed so as to be operated to run with a velocity difference between them. As one example thereof, the conveyor 30 is operated to run at 10 cm/sec and the conveyor 40 at 20 cm/sec. The needle members 46 of the conveyor 40 are formed longer than the needle members 36 of the conveyor 30.

The conveyors 30, 40 are constructed so that their running paths opposed to each other are arranged in parallel with each other so that the needle members 36, 46 of the conveyors 30, 40, respectively, mesh into each other along their entire adjacent running paths. Also, the conveyors 30, 40 are constructed so that their running paths opposed to each other run downwardly. The lower conveyors 30, 40 are positioned relative to the upper conveyors 1, 10 such that a running path center line B-B formed between the lower conveyors 30, 40 is laterally shifted to the right side in FIG. 1 relative to a running path center line A-A formed between the upper conveyors 1, 10.

Numeral 50 designates a casing arranged surrounding the four conveyors 1, 10, 30 and 40 and having its lower end provided with a discharge opening 51 of the alfalfa sprouts.

On the portion around the discharge opening 51, air ejecting nozzles 52 are provided. By ejecting air from the air ejecting nozzles 52, the alfalfa sprouts sticking to be accumulated in the vicinity of the discharge opening 51 of the casing 50 are separated to fall down.

With respect to the loosening device of the alfalfa sprouts constructed as illustrated and described above, an operation thereof will be described next. The alfalfa sprouts, as refined, to be supplied into a metering bucket (not shown) of a metering apparatus for the purpose of packaging are transferred by a scraping-up conveyor or the like (not shown) up to an upper portion of the adjacent and opposing running paths between the conveyors 1, 10 in the loosening device shown in FIG. 1. In the running paths opposed to each other between the conveyors 1, 10, the conveyors run downwardly. Hence, the sprouts are sent downwardly such that they are being caught on the needle members 6, 16 of the conveyors 1, 10. In the course of this transfer, the sprouts are loosened as if they are torn by the velocity difference between the needle members 6, 16 that gradually mesh into each other.

The alfalfa sprouts so loosened are sent into the running paths opposed to each other of the lower conveyors 30, 40 and again they receive tearing actions by the velocity difference between the conveyors 30, 40 to achieve a dispersed state. Then, the sprouts are caused to fall down from the discharge opening 51 of the casing 50 to be supplied into the metering bucket arranged below. Thereby, the alfalfa sprouts falling down are metered by a predetermined weight and supplied into a packaging apparatus from the metering bucket.

With the timing that the metering bucket has finished to deliver the sprouts of the predetermined weight, air is ejected from the air ejecting nozzles 52 and the sprouts sticking to be accumulated in the vicinity of the discharge opening 51 of the casing 50 are blown off to fall down into the metering bucket. Thereby, such a case can be avoided that the accumulated sprouts fall down into the metering bucket at the final stage of the metering by the metering bucket so that the timing of reaching an accurate weight passes over.

According to the loosening device as illustrated and described above, the alfalfa sprouts to be metered are loosened and in this state supplied into the metering bucket. Hence, the alfalfa sprouts of the predetermined weight can be accurately detected by the metering bucket to be supplied into the packaging apparatus.

In the foregoing, while the present invention has been concretely described based on the embodiment, as illustrated, of the bean sprouts-like articles loosening supply device according to the present invention, it is a matter of course that the present invention is not limited to the construction of the embodiment but may be added with various modifications.

Figure 3:
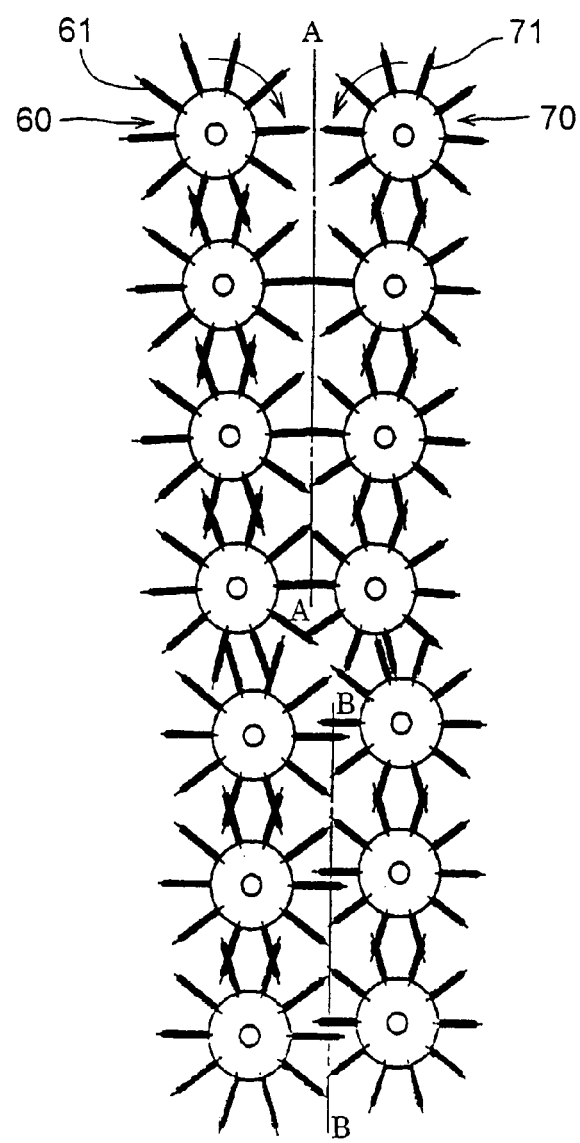
FIG. 3 is a side view showing a construction of a bean sprouts-like articles loosening supply device of another embodiment according to the present invention.
Figure 4:
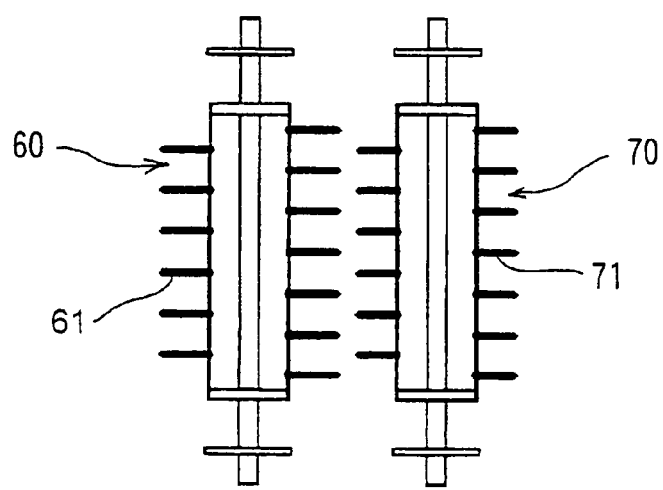
FIG. 4 is a plan view of the bean sprouts-like articles loosening supply device of FIG. 3.

For example, in the above-mentioned embodiment, while as the loosening member by which the sprouts are applied with the loosening actions, such as one constructed in which the conveyor running endlessly is employed, as one of the loosening members employable in the loosening device according to the present invention, one may be employed as constructed by a plurality of pairs of rollers, in which each of the rollers has its outer surface provided with a plurality of needle members that rise from the outer surface of the roller. In each of the pairs of rollers, the rollers have their axial directions arranged in parallel with each other and rotate at velocities different from each other. Such an example is shown in FIGS. 3 and 4. There, rollers 60, 70 are arranged in parallel with each other on the left side and right side so that a pair of rollers is constructed.

Each of the rollers 60, 70 has its cylindrical surface provided with a plurality of needle members 61, 71, respectively, that radially rise (extend) from the cylindrical surface. In the pair of rollers 60, 70, the needle members 61 are formed longer than the needle members 71. Four such pairs of rollers are arranged so as to be lapped one on another in the upward and downward direction so as to form a multi-stage state. In upper pairs of rollers thereof, an interval between the adjacent, opposing rollers 60 and 70 is made larger so that the needle members 61, 71 are arranged apart from each other. In lower pairs of adjacent, opposing rollers, that interval is gradually narrowed so that the needle members 61, 71 mesh into each other. The roller 60 is operated to rotate faster than the roller 70 and the rotating directions of the two rollers 60, 70 are reverse to each other such that both of the opposing roller surfaces of each adjacent pair of the two rollers 60, 70 move downwardly.

Below the upper pairs of rollers lapped one on another in four stages, three lower pairs of rollers lapped one on another so as to form a multi-stage state are arranged. In each of these upper pairs of rollers, the rollers are arranged on the right side and left side having their axial directions arranged in parallel with each other. In these lower pairs of rollers lapped in three stages, the rollers on the right side are positioned slightly higher than the rollers on the left side. It is to be noted that while a casing is provided surrounding all the pairs of rollers shown in FIGS. 3 and 4, illustration thereof is omitted.

In the lower pairs of rollers lapped in three stages, the rollers on the right side and left side are operated to rotate in the directions reverse to each other, as shown by arrows in FIG. 3, such that both of the opposing roller surfaces in each of the pairs of rollers move downwardly and the rollers on the left side rotate faster than the rollers on the right side. Like in the case of the loosening device by the conveyors shown in FIG. 1, a center line B-B formed between the rollers on the left side and right side in the lower pairs of rollers lapped in three stages is laterally shifted relative to a center line A-A formed between the rollers on the left side and right side in the upper pairs of rollers lapped in four stages.

In the loosening device comprising the pairs of rollers shown in FIGS. 3 and 4, while the bean sprouts-like articles supplied between the uppermost rollers 60, 70 are being transferred between the respective pairs of rollers, they receive the loosening actions of the needle members 61, 71 by the difference of the rotational velocity between the rollers on the right side and left side so that they are supplied in a sufficiently loosened state. It is to be noted that while, in FIG. 3, the rollers are arranged in four stages in the upper pairs of rollers and in three stages in the lower pairs of rollers, the number of stages is not limited thereto but may be appropriately selected and designed according to the case and it may be even one.

Also, in the above-described embodiments, while the two conveyors or two rollers are constructed such that the moving direction of the moving paths opposed to each other of the conveyors or rollers is directly downward, the moving direction is not limited to the downward direction but may be an inclined downward direction or a horizontal direction. Also, in the embodiments, while the loosening device is employed for supplying the sprouts of the loosened state into the metering apparatus, the device of the present invention is not limited to the use for the metering purpose but may be widely used for the cases where the bean sprouts-like articles are desired to be supplied in the loosened state. Moreover, in the embodiments, while the needle members of the two loosening members having their moving paths opposed to each other are constructed such that the needle members of the loosening member that is operated faster are formed longer so that the loosening effect can be enhanced, the construction of the needle members is not limited thereto but may be such that the needle members of the same length are used or the needle members in which longer members and shorter members are combined are used so that variety of the loosening actions can be obtained.

Further, in the above-described embodiments, while the case where the present invention is applied to the device for supplying the alfalfa sprouts as refined has been described, the present invention is not limited thereto but may be widely used for supplying various kinds of bean sprouts, cut vegetables, mesclun greens or other slender shape vegetables. Also, as to the running velocity difference or rotational velocity difference in the two conveyors or pair of rollers, it may be appropriately selected according to the degree of easiness of getting entangled due to the properties of the bean sprouts-like articles to be treated or according to the brittleness, such as the degree of easiness of getting broken, etc., of the bean sprouts-like articles.

Also, as to the arrangement of the two conveyors 1, 10 or rollers 60, 70 having their running paths opposed to each other, the degree of inclination angle of the two conveyors or rollers or the degree of meshing into each other of the needle members may be appropriately selected according to the properties of the bean sprouts-like articles to be loosened. In this regard, in order to make the relative position of the conveyors or rollers adjustable so that the interval between the conveyors or rollers having their running paths opposed to each other as well as the inclination angle of the arrangement of the conveyers or rollers can be set from time to time, it is preferable to provide a position setting construction by means of a bolt and slot. Also, if at least one of the conveyors or rollers opposed to each other is constructed to have a fluid-passability or permeability so that fluid can pass therethrough, by blowing fluid, such as air, out of the conveyors or rollers, the bean sprouts-like articles sticking to or caught on the needle members can be separated and removed. Also, by supplying a sterilizing gas, such as ozone, or other appropriate sterilizing fluid or bleaching fluid so that the bean sprouts-like articles to be treated are applied with a sterilizing treatment or bleaching treatment, the bean sprouts-like articles, after being treated, can be preserved fresh and clean for a longer period.

Also, in the above-described embodiment, as the conveyer device, while such a structure is employed in which the conveyor comprises the two chains, each of the chains being wound around the two sprockets, and the plurality of conveyor plates having both of their ends fitted to the chains, each of the conveyor plates being provided with the plurality of needle members, not necessarily this structure but devices of various other structures may be employed, if such a conveyor as is provided with the needle members and as is able to endlessly run can be constructed. Also, in the device as illustrated, the casing 50 is provided but it is not essential to provide the casing according to the kind of bean sprouts-like articles to be treated. Also, in the device as illustrated, while such a structure is employed in which the casing 50 is arranged surrounding the device and the air ejecting nozzles 52 are provided on the portion of the discharge opening 51 of the casing 50 so that the bean sprouts-like articles sticking to the discharge opening 51 portion of the casing 50 to be accumulated there are caused to fall down, it is not essential to provide the air ejecting nozzles, if falling of the accumulated bean sprouts-like articles gives less influence on the loosening operation.

Moreover, in the device as illustrated, while the air ejecting nozzles 52 are provided on the discharge opening 51 portion of the casing 50, the position or arrangement mode of the air ejecting nozzles can be appropriately selected and designed, if the bean sprouts-like articles accumulated on the discharge opening 51 portion of the casing 50 can be caused to fall down.

What is claimed is:

1. An articles-loosening supply device comprising:
at least two loosening members having outer surfaces, said loosening members being configured to move at different velocities and to oppose each other such that said outer surfaces form respective opposing moving paths between said loosening members for receiving and moving the articles, said loosening members being configured such that said outer surfaces along the moving paths move in the same direction; and
a plurality of needle members on said outer surfaces of said loosening members;
wherein said loosening members are arranged such that the respective moving paths are spaced further apart from each other at an upstream end of the moving paths than at a downstream end of the moving paths, and such that said needle members on said outer surfaces mesh with each other at least at a downstream end portion of the moving paths.

2. The articles-loosening supply device of claim 1, wherein said loosening members comprise at least two conveyors configured to move at different velocities, said conveyors each having end portions constructed to turn so that each of said conveyors runs endlessly, each of said conveyors having one of said outer surfaces with said needle members thereon.

3. The articles-loosening supply device of claim 2, wherein said conveyors have needle members with different lengths.

4. The articles-loosening supply device of claim 2, wherein said at least two conveyors comprises at least two conveyors arranged in series along the moving paths so that the articles delivered to the opposing moving paths at a first conveyor at the upstream end are supplied along the moving paths to a second conveyor at the downstream end.

5. The articles-loosening supply device of claim 2, wherein said conveyors are configured so that the opposing moving paths move downwardly from the upstream end.

6. The articles-loosening supply device of claim 5, further comprising a casing surrounding said at least two conveyors, said casing having a lower end with an articles discharge opening and a fluid ejecting nozzle for separating the articles sticking to a portion of said articles discharge opening of said casing.

7. The articles-loosening supply device of claim 2, wherein at least one of said conveyors has a fluid-passability, further comprising a sterilizing fluid port for supplying sterilizing fluid into the moving paths through said conveyors having said fluid-passability.

8. The articles-loosening supply device of claim 1, wherein said loosening members comprise a plurality of opposing pairs of rollers arranged in multiple stages along the moving paths, each of said pairs of rollers having their axial directions arranged in parallel and having said outer surfaces with said plurality of needle members, each of said pairs of rollers including rollers rotating at different velocities.

9. The articles-loosening supply device of claim 8, wherein said pairs of rollers have needle members with different lengths.

10. The articles-loosening supply device of claim 8, wherein said pairs of rollers comprise at least two pairs of rollers arranged in series along the moving paths so that the articles delivered to the opposing moving paths at a first pair of rollers at the upstream end are supplied along the moving paths to a second pair of rollers at the downstream end.

11. The articles-loosening supply device of claim 8, wherein said pairs of rollers are configured so that the opposing moving paths move downwardly from the upstream end.

12. The articles-loosening supply device of claim 11, further comprising a casing surrounding said pairs of rollers, said casing having a lower end with an articles discharge opening and a fluid ejecting nozzle for separating the articles sticking to a portion of said articles discharge opening of said casing.

13. The articles-loosening supply device of claim 8, wherein at least one of said pairs of rollers has a fluid-passability, further comprising a sterilizing fluid port for supplying sterilizing fluid into the moving paths through said at least one of said pairs of rollers having said fluid-passability.

14. The articles-loosening supply device of claim 1, wherein said loosening members have needle members with different length.

15. The articles-loosening supply device of claim 1, wherein said loosening members comprise at least two loosening members arranged in series along the moving paths so that the articles delivered to the opposing moving paths at a first loosening member at the upstream end are supplied along the moving paths to a second loosening member at the downstream end.

16. The articles-loosening supply device of claim 1, wherein said loosening members are configured so that the opposing moving paths move downwardly from the upstream end.

17. The articles-loosening supply device of claim 16, wherein said loosening members are arranged so that the moving paths at an upper stage at the upstream end are laterally shifted from the moving paths at a lower stage at the downstream end.

18. The articles-loosening supply device of claim 1, wherein the articles are selected from a group consisting of bean sprouts, cut vegetables, and mesclun greens.

19. An articles-loosening supply device comprising:
at least two loosening members having outer surfaces, said loosening members being configured to move at different velocities and to oppose each other such that said outer surfaces form respective opposing moving paths between said loosening members for receiving and moving the articles, said loosening members being configured such that said outer surfaces along the moving paths move in the same direction;
a plurality of needle members on said outer surfaces of said loosening members;
wherein said loosening members are arranged so that said needle members on said outer surfaces mesh with each other at least along a portion of the moving paths, and said loosening members are configured so that the opposing moving paths move downwardly from the upstream end; and
a casing surrounding said loosening members, said casing having a lower end with an articles discharge opening and a fluid ejecting nozzle for separating the articles sticking to a portion of said articles discharge opening of said casing.

20. An articles-loosening supply device comprising:
at least two loosening members having outer surfaces, said loosening members being configured to move at different velocities and to oppose each other such that said outer surfaces form respective opposing moving paths between said loosening members for receiving and moving the articles, said loosening members being configured such that said outer surfaces along the moving paths move in the same direction; and
a plurality of needle members on said outer surfaces of said loosening members;
wherein said loosening members are arranged so that said needle members on said outer surfaces mesh with each other at least along a portion of the moving paths; and
wherein at least one of said loosening members has a fluid-passability, further comprising a sterilizing fluid port for supplying sterilizing fluid into the moving paths through said at least one of said loosening members having said fluid-passability.

* * * * *